United States Patent [19]
Fleming et al.

[11] Patent Number: 5,198,310
[45] Date of Patent: Mar. 30, 1993

[54] THERMAL MANAGEMENT IN FUEL CELL SYSTEM BY FEED GAS CONDITIONING

[75] Inventors: Donald K. Fleming, Park Ridge; Raymond C. Rex, Jr., Dolton, both of Ill.

[73] Assignee: Institute of Gas Technology, Chicago, Ill.

[21] Appl. No.: 757,718

[22] Filed: Sep. 11, 1991

[51] Int. Cl.$^5$ ............................................... H07M 8/04
[52] U.S. Cl. ........................................ 429/17; 429/20; 429/26
[58] Field of Search ................... 429/16, 17, 20, 26, 429/30

[56] References Cited

U.S. PATENT DOCUMENTS

| | | |
|---|---|---|
| 2,465,462 | 3/1949 | Laying . |
| 3,266,938 | 8/1966 | Parker et al. . |
| 3,488,226 | 1/1970 | Baker et al. . |
| 4,064,156 | 12/1977 | McRobbie . |
| 4,242,103 | 12/1980 | Rabo et al. . |
| 4,522,894 | 6/1985 | Hwang et al. . |
| 4,569,890 | 2/1986 | Barthel . |
| 4,921,765 | 5/1990 | Gmeindl et al. ....................... 429/16 |
| 4,925,745 | 5/1990 | Remick et al. .................... 429/16 X |
| 5,034,287 | 7/1991 | Kunz ................................. 429/26 X |
| 5,077,148 | 12/1991 | Schora et al. ......................... 429/16 |

*Primary Examiner*—Stephen Kalafut
*Attorney, Agent, or Firm*—Speckman & Pauley

[57] ABSTRACT

A process for thermal management by feed gas conditioning in high temperature fuel cell systems wherein at least a portion of a fuel feed stream is chemically reacted in an exothermic chemical reaction in an external zone thermally separated from the fuel cell system and at least a portion of the products of such exothermic chemical reaction are passed to an internal zone in thermal exchange with the fuel cell system and reacted in an endothermic chemical reaction thereby absorbing heat from the exothermic electrochemical reaction within the fuel cell system producing a process stream of higher thermal energy. At least a portion of the higher thermal energy stream is removed from the fuel cell system, thereby maintaining the desired operating temperature in the fuel cell system. The process significantly reduces energy requirements of the system and significantly increases overall system efficiency and the output voltage of the system. The process is especially suited to molten carbonates electrolyte and solid oxide fuel cells.

19 Claims, 3 Drawing Sheets

THERMAL MANAGEMENT IN FUEL CELL SYSTEM BY FEED GAS CONDITIONING

BACKGROUND OF THE INVENTION

1. Field of the Invention

This invention relates to a process for thermal management in high temperature fuel cell systems by feed gas conditioning to result in higher overall system efficiency in the production of electricity. The process of this invention is advantageously utilized in the integration of gasification of naturally occurring carbonaceous material, such as coal, with molten alkali metal carbonates electrolyte fuel cell electrical production.

2. Description of Related Art

The catalytic reduction of carbon oxides to form methane is generally known, such as by the teachings of U.S. Pat. Nos. 2,465,462 and 4,242,103. U.S. Pat. No. 4,064,156 teaches production of methane wherein prior to methanation the feed gas is over shifted with $CO_2$ removal to moderate temperature rise in the methanation reactors.

U.S. Pat. No. 4,569,890 teaches use of a low temperature phosphoric acid fuel cell, to consume hydrogen and to provide a higher methane content product gas in a coal gasification/fuel cell co-generation system.

Increasing the hydrogen content of the fuel feed stream to the anode compartment of a fuel cell is taught by several patents. U.S. Pat. No. 3,266,938 teaches a plurality of high temperature fuel cells arranged in series such that the spent gases from the anode compartment of the first fuel cell in the series is catalytically reformed exterior to the cell by an endothermic reforming reaction to produce additional hydrogen and then passed to the anode compartment of a second cell in the series; the spent gases of the anode compartment of the second fuel cell is passed to a catalytic exothermic shift reaction exterior to the cell for further production of hydrogen for passage to the anode compartment of a third fuel cell in the series. The reforming and shift reactions are performed exterior to the fuel cells to provide greater hydrogen content to the fuel feeds to the anode compartments of the fuel cells. U.S. Pat. No. 4,522,894 teaches increasing the hydrogen content of a liquid hydrocarbon feed by catalytic oxidation and steam reforming wherein use of thermal energy from the oxidation is used for reforming external to the fuel cell to produce high hydrogen content in the fuel feed stream to the anode compartment of the fuel cell. U.S. Pat. No. 3,488,226 teaches low temperature, low pressure steam reforming of liquid hydrocarbons to enhance hydrogen in the fuel feed for the anode compartment of molten carbonate fuel cells wherein the reforming is performed exterior to the fuel cell and acts as a heat sink for fuel cell produced heat. In one embodiment, the reforming catalyst may be placed in the fuel cell anode chamber. In either arrangement, the waste heat from the fuel cell is used directly to sustain the endothermic reforming reaction for the generation of hydrogen.

Reforming of hydrocarbonaceous fuels in separated compartments spaced within a fuel cell stack has been described in allowed U.S. Pat. No. 5,077,148, owned by the same assignee as this application.

In molten carbonates electrolyte fuel cell operation, a large percentage of the energy of the fuel is released as heat and must be removed from the fuel cell stack or system. At the operating temperature of molten carbonates electrolyte fuel cells of about 1200° F., the heating value of hydrogen is equivalent to 1.285 volts. In normal operation of such a fuel cell, at about 0.70 to about 0.75 volt output, about 55 to about 65 percent of the energy content of hydrogen fuel is recovered as electricity and the remainder is released as heat which must be removed from the system. However, in systems where gas derived from fossil fuels is used, carbon monoxide having a heating value equivalent to 1.5 volts cannot be utilized directly in the electrochemical reaction and undergoes a water-gas-shift reaction in the anode compartment of the fuel cell producing additional hydrogen fuel, but releasing heat as the carbon monoxide is reacted. This additional heat must also be removed from the cell, and in such fuel cell systems the relationship of electrical energy to heat energy is less than stated above. In present day molten alkali metal carbonates electrolyte fuel cell operation, the internally produced heat is withdrawn with the process gases by allowing the temperature to rise across the cell. In molten alkali metal carbonates electrolyte fuel cell operation where anode gases are passed countercurrent to cathode gases, the heat is removed by the temperature rise of the cathode process stream where the generally permissible temperature rise is about 180° F. To approach the desired operating temperature of about 1200° F., the cathode inlet temperature must be maintained at about 1110° F. and the outlet temperature about 1290° F. The cathode feed stream comprises oxidant, usually air, and combusted anode exhaust to provide the necessary recycle volume of carbon dioxide within the system. This quantity of flow through the cathode is not high enough to withdraw sufficient heat from the system to maintain the permissible temperature rise. Generally, recycle of the cathode exhaust stream to the cathode inlet after cooling is used to provide sufficient mass to withdraw heat from the system to maintain the desired temperature. However, this procedure has several severe disadvantages: dilution of the cathode feed with lean cathode exhaust results in low concentration of cathode reactants thereby reducing the cell voltage; pressure drops across the cathode are increased due to the relatively high gas flow; and a large recycle blower is required due to the high recycle flow necessary and the high temperature of the cathode exhaust. It can be estimated that in atmospheric pressure systems, as may be required by the economics of small, on-site power plants, the power required for the cathode recycle blower can be in the order of 12.3 percent of the total energy fed to the system in the initial fuel gas. In such a heat-balanced system, the recycle ratio of the quantity of cathode exhaust recycled to the quantity of final system exhaust is about 4.4. With this quantity of cathode recycle, the cathode feed concentration of carbon dioxide is 7.94 percent and of oxygen is 7.37 percent, based upon an overall stoichiometric air to fuel ratio of 1.6. These concentrations are significantly lower than the 30 percent carbon dioxide and 15 per oxygen normally encountered in laboratory fuel cells, causing significant voltage loss in the system output.

SUMMARY OF THE INVENTION

It is an object of this invention to provide a process of for improved thermal management by feed gas conditioning in high temperature fuel cell systems to increase system efficiency.

It is another object of this invention to provide a process for thermal management in high temperature fuel cell systems which significantly reduces or eliminates use of cathode recycle for removal of heat from the system, thereby significantly increasing overall system efficiency.

It is yet another object of this invention to provide a process for thermal management in high temperature fuel cell systems wherein increased reactant concentrations in the cathode feed significantly increases the fuel cell system output voltage.

Still another object of this invention is to chemically treat at least a portion of the fuel feed stream exterior to and thermally isolated from the fuel cell system thereby promoting endothermic chemical reactions within the fuel cell system absorbing fuel cell produced thermal energy, thereby controlling the fuel cell system temperature while reducing cathode recycle and providing richer reactant cathode feed gases to significantly increase the fuel cell system efficiency.

These and other objects and advantages of the invention are achieved by a process for thermal management in high temperature fuel cell systems by fuel gas conditioning wherein at least a portion of a fuel feed stream is chemically reacted in an exothermic chemical reaction in an external zone thermally separated from the fuel cell system; at least portion of the products of the exothermic chemical reaction are passed to an internal zone in thermal exchange relation with the fuel cell system and are chemically reacted in an endothermic chemical reaction in the internal zone, thereby absorbing heat from the exothermic electrochemical reaction within the fuel cell system producing a process stream of higher thermal energy; and removing at least a portion of the higher thermal energy process stream from the fuel cell system, thereby maintaining the desired temperature in the fuel cell system.

In one preferred embodiment, the exothermic chemical reaction is methanation of carbon oxide to methane and the endothermic chemical reaction is reforming of methane to carbon oxide and hydrogen. In another preferred embodiment, the exothermic chemical reaction is water-gas-shift of carbon oxide to hydrogen and the endothermic reaction is the reverse water-gas-shift reaction forming carbon oxide. In a preferred embodiment, the process of this invention is advantageously integrated with gasification of naturally occurring carbonaceous materials, such as coal where the fuel feed stream comprises hydrogen, carbon oxides and methane. In another preferred embodiment, the process of this invention may use natural gas as at least a portion of the fuel feed stream. Suitable high temperature fuel cells for use in this invention include molten alkali metal carbonates electrolyte fuel cells and solid oxide fuel cells.

Prior efforts to increase overall process efficiency in gasification/fuel cell integrated systems have been primarily directed toward increasing the hydrogen content of fuel fed to the fuel cell in the mistaken belief that higher fuel feed hydrogen concentration will necessarily result in a higher fuel cell voltage. Due to the catalytic activity of anode catalysts such a nickel in the molten alkali metal carbonates electrolyte fuel cell, the hydrogen concentration in the anode chamber will reach a chemical equilibrium concentration due to the rapidity of the water gas shift and its reverse reaction. This invention is directed toward higher overall system efficiency improvement, from the fuel source, such as the coal pile, to the electrical bus bar. In the process of the present invention, incorporation of exothermic chemical reactions in the fuel feed to the cell allows energy obtained from heat removal from the cell to be profitably utilized in advantageous chemical reactions and in preheating the feed stock rather than unprofitably recovered in a steam cycle. In the process of this invention, it is the net energy savings in the overall system which is of concern.

In a molten alkali metal carbonates electrolyte fuel cell on the order of 50% of the output energy is heat which must be removed from the fuel cell system. In the process of this invention this fuel cell produced heat energy is advantageously adsorbed by endothermic chemical reactions within the fuel cell system and removed from the fuel cell system and utilized in extracellular thermal exchange and the ga utilized in extracellular exothermic chemical reactions to preheat the feed and to provide a feed chemically suited for endothermic in cell reaction to adsorb heat from the exothermic electrochemical reactions, thereby more efficiently controlling the fuel cell system thermal energy as compared with present processes of recycle of cathode exhaust requiring large energy expenditure and resulting in a leaner or diluted feed which results in lower voltage.

BRIEF DESCRIPTION OF THE DRAWING

The above and further objects and advantages of the invention will be apparent by reference to the drawing wherein.

DESCRIPTION OF PREFERRED EMBODIMENTS

Figure 1:
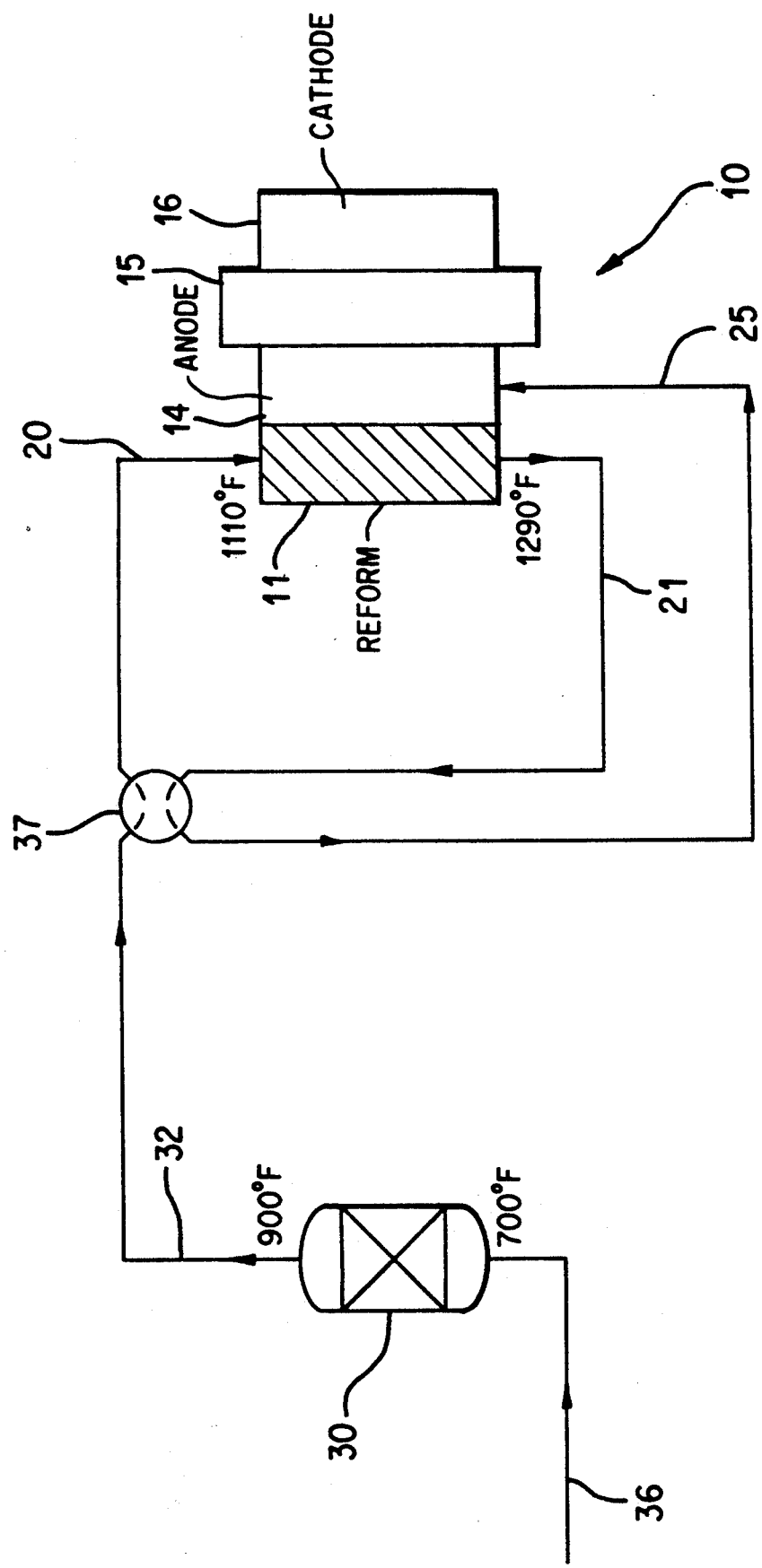
FIG. 1 is a simplified schematic process flow diagram of one embodiment of this invention using external methanation and internal reforming with indirect thermal exchange.

The process of the present invention relates to thermal management by fuel gas conditioning in high temperature fuel cell systems. By the terminology "high temperature" fuel cell systems, is meant those fuel cells which operate at temperatures of greater than about 1100° F., such as molten alkali metal carbonates electrolyte fuel cells and solid oxide fuel cells. Suitable fuel feeds for these cells are hydrogen containing gases which may be obtained from gasification of naturally occurring carbonaceous materials. Integrated gasification/fuel cell electrical production systems are advantageous in the conversion of carbonaceous materials such as coal, peat, shale, waste, and biomass to electrical energy. Suitable mixed gases may be obtained from any available source, such as natural gas reformers, petroleum refinery waste gases, and other sources providing mixed gases of similar composition. Natural gas may be used in the process according to certain embodiments of this invention. Chemical process and gasifier fuel feeds are especially suitable for the process of this invention since they provide gases at a temperature of about 700–800° F. In the gasification of naturally occurring carbonaceous materials, the product gas may contain sulfur in an amount in excess of that tolerable by the catalyst used and in such cases, sulfur may be reduced in the formation of the product gas or removed from the product gas by methods known to the art to a level consistent with the tolerance of the catalyst which is contacted. The 700 to 800° F. gas is compatible with sulfur removal processes.

Suitable reactions for conditioning the fuel gas feed for the fuel cell system in a zone thermally separated from the fuel cell system are exothermic reactions of methanation $4H_2 + CO_2 \rightarrow CH_4 + 2H_2O$ and $3H_2 + CO \rightarrow CH_4 + H_2O$ and the forward water-gas-shift shift reaction $H_2O + CO \rightarrow H_2 + CO_2$. The external exothermic chemical reaction preheats the fuel gas and in combination with introduced steam and heat transfer from anode exhaust gas provides fuel gas to the anode compartment of the fuel cell at a desired temperature of between about 1000 to 1200° F. In addition, the external exothermic chemical reaction provides a higher concentration of reactant for desired endothermic reaction in thermal exchange with the fuel cell system for heat removal, such as reforming $CH_4 + 2H_2O \rightarrow 4H_2 + CO_2$ and $CH_4 + H_2O \rightarrow 3H_2 + CO$ and reverse shift $H_2 + CO_2 \rightarrow CO + H_2O$. The methanation/reforming pair tranfers more heat per unit of gas circulated that the shift/reverse shift pair, but the shift reaction is easier to control and less subject to catalyst poisoning. In one embodiment of the process of this invention, it is desirable to condition more gas external to the system than can be utilized by the fuel cell to provide excess gas for recycle to the external treatment system for enhanced energy recovery from the fuel cell system. In preferred embodiments, greater than about 50 percent of the effluent stream of the internal endothermic chemical reaction is recycled to the external exothermic chemical reaction, and in some preferred embodiments greater than about 70 percent is recycled.

The methanation/reforming and shift/reverse shift reactions are well known reactions which can be conducted according to methods known to the art. The methanation/reforming reactions may be performed over nickel or any other suitable catalyst. The shift/reverse shift reactions may be performed over conventional copper-iron or an other suitable catalyst.

Heat removal from the fuel cell system ma be achieved by direct o indirect thermal exchange with the endothermic chemical reaction. For direct thermal exchange, the endothermic chemical reaction takes place within one of the electrode compartments of the fuel cell. The water-gas-shift reaction may be promoted within the anode compartment of the fuel cell by the active electro-catalyst, such as nickel. Alternatively, when a steam/methane reforming catalyst is included within the anode compartment of the fuel cell, hydrogen required for the electrochemical reaction is made from steam and methane fed to the anode for direct thermal exchange internal reforming. For indirect thermal exchange, the endothermic chemical reaction takes place in separated chambers within the fuel cell stack and in thermal exchange relation with the fuel cells. Such endothermic reaction chambers may be layered with the unit fuel cells, about every three to ten cells in the stack. Such reaction chambers contain reforming and/or shift catalysts to promote the desired endothermic reactions. As the endothermic reactions take place, heat is removed by indirect thermal exchange from adjacent fuel cells and, by thermal conduction, throughout the fuel cell stack.

While the methanation/reforming and water-gas-shift/reverse water-gas-shift pairs are used to illustrate preferred embodiments of this invention, it is apparent to one skilled in the art that other exothermic/endothermic chemical reaction pairs may be used in the practice of the invention, particularly in the preferred indirect thermal exchange practice of the invention. The indirect thermal exchange according to this invention is especially preferred when used in conjunction with molten alkali metal carbonates electrolyte fuel cells due to the catalyst poisoning properties of the molten alkali metal carbonates electrolyte under fuel cell operating conditions.

A typical fuel feed gas generated by a steam/methane reforming reaction at a relatively low temperature and pressure has the composition:

TABLE 1

| Component | Percent |
| --- | --- |
| $H_2$ | 55.54 |
| CO | 9.65 |
| $CO_2$ | 6.99 |
| $H_2O$ | 27.53 |
| $CH_4$ | 0.30 |

As contrasted to the present invention, this gas when fed to a molten alkali metal carbonates electrolyte fuel cell stack with an overall air/fuel stoichiometric ratio of 1.6 for a given set of electrode activity constants and internal cell resistance is estimated to produce 0.689 volts per cell. When the fuel cell stack is in thermal balance, the recycle of cathode exhaust necessary for heat removal is 4.36 times the total exhaust from the system and the concentration in the cathode feed of $CO_2$ is 7.94% and of $O_2$ is 7.37%.

According to one embodiment of the present invention, as schematically shown in FIG. 1, fuel feed gas stream 36 having a temperature of 700° F. and the composition set forth in Table 1, is treated by conduct of an exothermic methanation reaction in external methanator 3 thermally separated from fuel cell system 10 resulting in external methanator effluent stream 32 having a temperature of 900° F. and the following composition:

TABLE 2

| Component | Percent |
| --- | --- |
| $H_2$ | 31.12 |
| CO | 0.88 |
| $CO_2$ | 7.75 |
| $H_2O$ | 47.78 |
| $CH_4$ | 12.68 |

The methanation reaction will require cooling, with recovery of the by-product heat, to avoid exceeding the temperature limit of the methanation catalyst. This cooling ca be effected by any suitable means known to the art, such as cooling coils within the reaction system or receycle of a portion of the methanator effluent back to the feed after cooling. The methanated gas may be fed to the fuel cell system with either direct or indirect reforming within the fuel cell system. FIG. 1 shows external methanator effluent stream 32 passing through recuperative thermal exchanger 3 in thermal exchange relation with hotter internal reformer effluent stream 21 to heat internal reformer feed stream 20 to about 1110° F. for introduction to internal reformer chamber 11. Internal reformer chamber 11 is in indirect thermal exchange with fuel cell system 10 comprising a unit cell of anode 14, electrolyte 15, and cathode 16 and has the flow of the fuel gas over the reforming catalyst passing in the direction of the temperature rise of the fuel cell, countercurrent to the flow of fuel gas through anode chamber 14. Following the endothermic reforming reaction in internal reformer chamber 11, the composition of internal reformer effluent stream 21 is nearly identical to the initial fuel gas feed 36 to methanator 30. Internal reformer effluent stream 21 leaves internal reformer chamber 11 at 1290° F. and is passed in thermal exchange with external methanator effluent stream 32 to heat internal reformer feed stream 20 to 1110° F. and to cool anode feed stream 25 to 1110° F. Although the chemical composition of the anode fuel was not changed substantially, sufficient heat is absorbed by the endothermic chemical reforming reaction and by the 180° F. temperature rise across internal reformer chamber 11 to reduce the quantity of the cathode recycle required by over 50 percent. The concentration in the anode exhaust of $CO_2$ was increased to 9.62% and of $O_2$ to 8.12% providing increased oxidant concentrations at the cathode which increased the cell potential from 689 mV to 699 mV. System efficiency has been improved both due to higher cell potential and by the parasitic power demand of the energy-consumptive cathode recycle blower being halved. Reduction of size of the cathode exhaust cooling system is of particular importance since it provides reduction in capital cost of the plant which translates, percentage wise, into a equivalent of about five times the percentage increase in efficiency.

Figure 2:
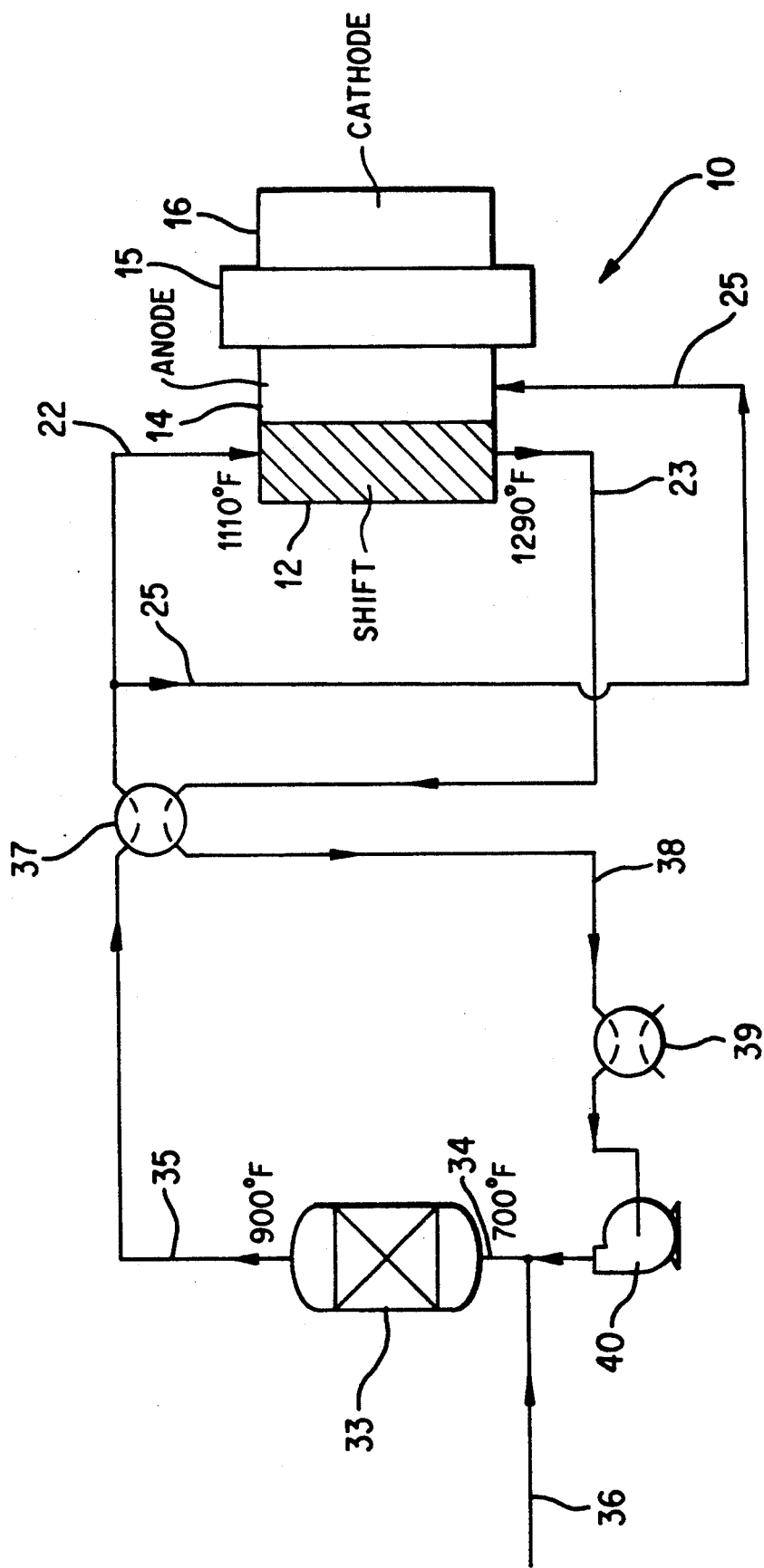
FIG. 2 is a simplified schematic process flow diagram of another embodiment of this invention using external water-gas-shift and internal reverse water-gas-shift with indirect thermal exchange and recycle.

According to another embodiment of this invention, as shown schematically in FIG. 2, fuel feed gas stream 36 having a temperature of 700° F. and the composition set forth in Table 1, is treated by conduct of the water-gas-shift reaction in external water-gas-shift reactor 33 thermally separated from fuel cell system 10. External water-gas-shift reactor 33 is preferably considerably oversized, based upon the anode compartment fuel gas flow, to accommodate the high quantity of recycle of fuel gas used in this embodiment. The external water-gas-shift effluent stream 35 has a temperature of 813° F. and enhanced hydrogen content. The external water-gas-shift effluent steam 35 is passed through recuperative thermal exchanger 37 in thermal exchange relation with hotter internal reverse water-gas-shift effluent stream 23 to heat internal reverse water-gas-shift feed stream 22 and anode feed stream 25 to a temperature of 1110° F. After passing through recuperative thermal exchanger 37, the gas stream is split into anode feed stream 25 to provide the normal quantity of anode fuel gas flowing counter-currently to the cathode oxidant flow within the fuel cell system and into internal reverse water-gas-shift feed stream 22 which is passed, parallel to the flow of oxidant in the cathode chamber 16, in internal reverse water-gas-shift chamber 12 for conduct of the internal endothermic chemical reaction of consumption of hydrogen to form carbon monoxide in indirect thermal exchange with the fuel cell system. Internal reverse water-gas-shift feed stream 22, in heat balance, contains 8.45 times the flow of the anode feed stream 25, calculated to absorb all of the excess heat release in the fuel cell system. Internal reverse water-gas-shift effluent stream 23 leaves internal reverse water-gas-shift chambers 12 at 1290° F and is passed in thermal exchange with external water-gasshift effluent stream 35 to heat internal water-gas-shift feed stream 22 and anode feed stream 25 to 1110° F. and becomes water-gas-shift recycle stream 38 which is further cooled to 700° F. by water-gas-shift recycle thermal exchanger 39 which may supply heat to fuel gas feed stream 36 as required. After cooling, the recycle stream is passed through blower 40, and mixed with fuel gas feed stream 36 to provide external water-gas-shift feed stream 34.

In the described system, a relatively high quantity of ga is recycled between external water-gas-shift reactor 33, thermally isolated from fuel cell system 10, and internal reverse water-gas-shift chambers 12 in thermal exchange with fuel cell system 10. All of the excess heat generated by the fuel cell system is withdrawn by thermal exchange and the paired endothermic/exothermic chemical reactions of the recycle loop. Thus, the fuel cell system is in thermal balance with no recycle of hot cathode exhaust being required. The cathode feed has oxidant concentrations of 17.28% carbon dioxide and 11.51% oxygen which results in increasing the fuel cell voltage from 689 mV to 730 mV. The described system has eliminated the need for a power-consumptive, hot stream cathode recycle blower providing about 12 percent increase in system efficiency. Further, the increased voltage from the fuel cell stack increases the system efficiency about 2 percent. The only added energy consumption is the water-gas-shift recycle blower which operates at 700° F., rather than 1200° F. as with a cathode exhaust recycle, and in which the flow rate is lower than a cathode recycle. In spite of the apparently high anode recycle rate, in view of the reduced temperature and reduced molecular weight of the gas in the anode recycle stream, the quantity of gas passing through the anode recycle blower is about 50 percent of the volumetric flow rate that would otherwise have been required in a cathode blower. The power requirement for the anode recycle blower is less than 20 percent of the power that would be otherwise be required for a cathode recycle.

Figure 3:
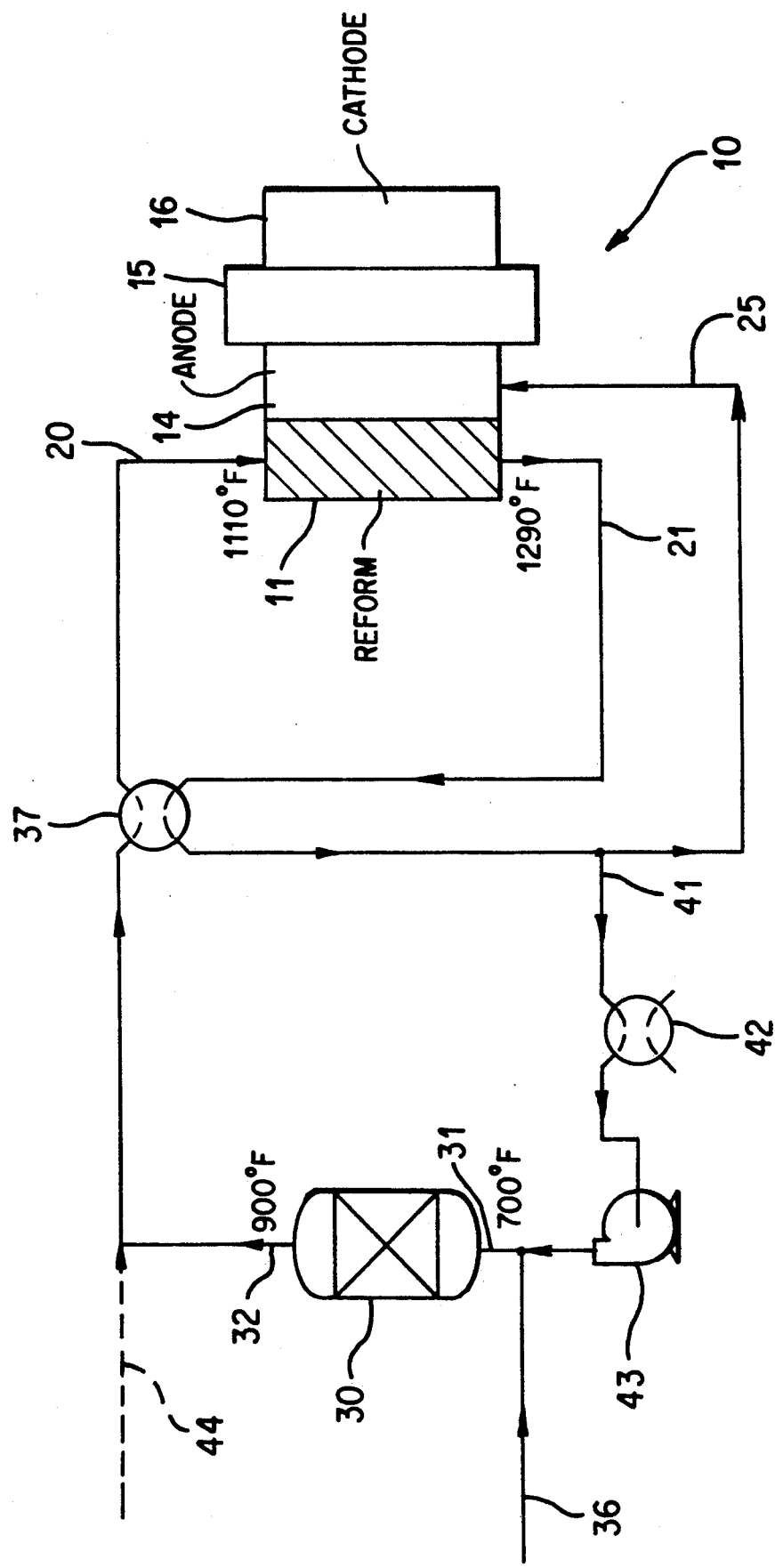
FIG. 3 is a simplified schematic process flow diagram of another embodiment of this invention using external methanation and internal reforming with indirect thermal exchange and recycle.

In accordance with another embodiment of the invention, shown schematically in FIG. 3, an external methanation reaction and an internal reforming reaction may be carried out in a manner similar to described with respect to FIG. 2 for the external water-gas-shift reaction and its internal reverse reaction. Fuel feed gas stream 36 having a temperature of 700° F. and the composition set forth in Table 1, is treated by conduct of a methanation reaction, the reverse of steam/methane reforming, in external methanator 30 thermally separated from fuel cell system 10. External methanator 30 is considerably oversized, based upon the anode compartment fuel gas flow, to accommodate the high quantity of recycle of fuel gas used in this embodiment. As previously mentioned, the heat generation in the methanator is high and cooling must be provided to maintain the temperature below the maximum operating temperature of the methanation catalyst. External methanation effluent stream 32 is passed through recuperative thermal exchanger 37 in thermal exchange relation with hotter internal reformer effluent gas stream 21 to heat internal reformer feed stream 20 to a temperature of 1110° F. After passing through thermal exchanger 37, internal reformer feed stream 20 is passed to internal reformer chambers 11 for conduct of the reforming reaction forming hydrogen and carbon monoxide from methane and water vapor in an endothermic reaction in thermal exchange relation with fuel cell system 10. Internal reformer effluent stream 21 is cooled by passage through recuperative thermal exchanger 37 and the stream then split so that about 15 percent of the stream becomes anode feed stream 25 and passed to anode chamber 14 for conduct of the electrochemical reaction and about 85 percent becomes methanator recycle stream 41. Methanator recycle stream 41 is further cooled to 700° F. in methanator recycle thermal exchanger 42, passed through methanator recycle blower 43, and mixed with fuel gas feed 36 to provide external methanator feed stream 31.

In the described system, all of the excess heat generated by the fuel cell system is withdrawn by internal reformer effluent stream 21 for thermal recovery and recycle. Again, the system efficiency is enhanced by 12 percent due to elimination of the cathode recycle blower. A significantly smaller portion of this energy is required for operation of the reformer effluent recycle blower at less volume and lower temperature. The cathode feed has concentrations of 17.28% carbon dioxide and 11.51% oxygen which results in increasing the fuel cell voltage by 41 mV, resulting in a system efficiency increase of about 2 percent. In this embodiment, the cathode feed composition and the efficiency achieved are identical to the prior described embodiment since the same quantity of heat was removed from the system.

While the above fuel cell systems have been described using a fuel gas feed, such as derived from gasification of naturally occurring carbonaceous material, natural gas can be used as a supplemental feed or as the total feed and fed directly to internal reformer chamber 11 as shown by natural gas feed stream 44 in FIG. 3.

In the above description and in the drawing, anode feed stream 25 has been shown as coming from internal reformer effluent stream 21 or internal reverse water-gas-shift effluent stream 23. It should be recognized that while these may be preferred embodiments, anode feed stream 25 may be fed separately from the heat removal system and the heat removal system of external exothermic chemical reaction/internal endothermic chemical reaction may be operated in a closed loop independent of the anode gas feed.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of the invention.

We claim:

1. A process for thermal management in high temperature molten alkali metal carbonates fuel cell systems by anode feed gas conditioning comprising:

chemically reacting at least a portion of a anode fuel gas feed stream in an exothermic chemical reaction in an external zone thermally separated from said fuel cell system;

passing at least a portion of the products of said exothermic chemical reaction to an internal reaction zone adjacent an anode and in indirect thermal exchange relation with said fuel cell system;

chemically reacting at least a portion of said products of said exothermic chemical reaction in an endothermic chemical reaction in said internal reaction zone in indirect thermal exchange relation with said fuel cell, thereby absorbing heat from exothermic electrochemical reaction within said fuel cell system producing a higher thermal energy process stream from said internal endothermic chemical reaction;

passing a first portion of said higher thermal energy stream of an anode as fuel; and removing a second larger portion of said higher thermal energy process stream directly from said fuel cell system.

2. A process according to claim 1 wherein said exothermic chemical reaction is methanation of carbon oxide to methane and said endothermic chemical reaction is reforming of methane to carbon oxide and hydrogen.

3. A process according to claim 1 wherein said exothermic chemical reaction is a forward water-gas-shift reaction of carbon dioxide to hydrogen and said endothermic chemical reaction is a reverse water-gas-shift reaction forming carbon oxide.

4. A process according to claim 1 wherein said second portion of said higher thermal energy process stream from said internal endothermic chemical reaction is passed as a recycle stream in sequence internal exchange with said products of said exothermic chemical reaction thereby heating said products of said exothermic chemical reaction to the lowest desired temperature for maintenance of said fuel cell system operating temperature, then passed in thermal exchange with an external cooling source to further lower the temperature of said recycle stream to a suitable temperature for introduction to said exothermic chemical reaction, and then passing said lowered temperature recycle stream through a blower passing it into said exothermic chemical reaction.

5. A process according to claim 1 wherein greater than about 70 percent of said higher thermal energy process stream from said internal endothermic chemical reaction is recycled to said external exothermic chemical reaction eliminating the need for any cathode exhaust recycle for fuel cell system cooling.

6. A process according to claim 1 wherein the effluent stream of said exothermic chemical reaction is passed in thermal exchange with the effluent stream of said endothermic chemical reaction to heat said effluent stream of said exothermic chemical reaction to the lowest desired temperature for maintenance of said fuel cell system operating temperature.

7. A process according to claim 1 wherein said fuel feed stream is the product stream of gasification of naturally occurring carbonaceous material and comprises hydrogen, carbon oxides, and methane.

8. A process according to claim 7 wherein said carbonaceous material is coal.

9. A process according to claim 1 wherein natural gas is fed directly to said internal reaction zone for reforming reaction as said endothermic chemical reaction.

10. A process according to claim 1 wherein all of said higher thermal energy process stream from said internal endothermic chemical reaction is recycled to said external exothermic chemical reaction providing a closed loop heat removal system independent of an anode feed stream.

11. A process according to claim 1 wherein said exothermic chemical reaction is methanation of carbon oxide to methane and said endothermic chemical reaction is reforming of methane to carbon oxide and water, said higher thermal energy process stream from said endothermic chemical reaction is passed in thermal exchange with the effluent stream of said exothermic chemical reaction cooling it to the lowest desired temperature for maintenance of said fuel cell system operating temperature, and a portion of the cooled higher thermal energy process stream is passed to the anode compartment as fuel and greater than about 50 percent of said cooled endothermic chemical reaction effluent stream recycled to said exothermic chemical reaction.

12. A process according to claim 11 wherein natural gas is fed to said reforming reaction.

13. A process for thermal management in high temperature fuel cell systems by anode feed gas conditioning comprising:

chemically reacting at least a portion of a anode fuel gas feed stream in a forward water-gas-shift reaction of carbon oxide to hydrogen exothermic chemical reaction in an external zone thermally separated from said fuel cell system;

passing at least a portion of the products of said exothermic chemical reaction to an internal reaction zone in thermal exchange relation with said fuel cell system;

chemically reacting at least a portion of said products of said exothermic chemical reaction in a reverse water-gas-shift endothermic chemical reaction in said internal zone, thereby absorbing heat from exothermic electrochemical reaction within said fuel cell system producing an effluent stream from said endothermic chemical reaction of higher thermal energy; and removing at least a portion of said effluent stream from said fuel cell system.

14. A process according to claim 13 wherein said fuel cell system comprises molten alkali metal carbonates electrolyte fuel cells.

15. A process according to claim 13 wherein said fuel cell system comprises solid oxide fuel cells.

16. A process according to claim 13 wherein said reaction internal zone is in indirect thermal exchange with said fuel cell system.

17. A process according to claim 13 wherein said fuel cell system comprises molten alkali metal carbonates electrolyte fuel cells, said internal zone is in indirect thermal exchange with said fuel cell system, and substantially all of said higher thermal energy process stream from said endothermic chemical reaction is recycled to said external chemical reaction.

18. A process according to claim 13 wherein a portion of the stream from said forward water-gas-shift reaction is cooled and passed directly to said anode compartment as fuel.

19. A process for thermal management in high temperature fuel cell systems by anode feed gas conditioning comprising:

chemically reacting at least a portion of a anode fuel gas feed stream in an exothermic chemical reaction in an external zone thermally separated from said fuel cell system;

passing at least a portion of the products of said exothermic chemical reaction to an internal reaction zone in thermal exchange relation with said fuel cell system:

chemically reacting at least a portion of said products of said exothermic chemical reaction in an endothermic chemical reaction in said internal reaction zone, thereby absorbing heat from exothermic electrochemical reaction within said fuel cell system producing an effluent stream of higher thermal energy; and recycling all of said effluent stream from said fuel cell system to said external exothermic chemical reaction providing a closed loop heat removal system independent of an anode feed stream.

* * * * *